United States Patent [19]

Allison

[11] 4,346,547
[45] Aug. 31, 1982

[54] LAWN MOWER

[76] Inventor: Robert B. Allison, 8424 E. Lake Rd., Erie, Pa. 16511

[21] Appl. No.: 248,264

[22] Filed: Mar. 27, 1981

[51] Int. Cl.³ .......................................... A01D 35/26
[52] U.S. Cl. ...................................... 56/13.6; 56/6; 56/17.2
[58] Field of Search ................... 56/13.6, 6, DIG. 22, 56/320.1, 320.2, 503, 17.2, 13.7

[56] References Cited

U.S. PATENT DOCUMENTS 2,979,878  4/1961  Kaposta .............................. 56/13.6
3,564,822  2/1971  Engler ................................ 56/13.6

*Primary Examiner*—Jay N. Eskovitz
*Attorney, Agent, or Firm*—Charles L. Lovercheck; Wayne L. Lovercheck; Dale R. Lovercheck

[57] ABSTRACT

A mower having a rectangular platform and downwardly extending skirts on the sides of the platform, spaced upwardly extending columns on the platform, an engine supported on the platform in columns. A belt tightener arm is pivoted around a fourth column and a third pulley is supported on the arm. A threaded bolt pulls the belt tightener toward the belt thereby tightening it. Two rear wheels are supported on two wheel support levers, each of the rear wheels being supported on the distal end of one of the wheel support levers which are pivoted to the skirt of the platform. The end of the wheel support lever remote from the wheel is adjustable up and down to raise or lower the wheel. The front wheels are mounted as casters attached to upwardly and forwardly extending arms that are attached to the platform, and a drilled cylinder extends downwardly from the distal end of the arm. A shaft of the caster extends up through the hollow cylinder and has an axially threaded member holding it in place. Washers are placed on the shaft below the drilled cylinder to adjust the platform for height. By adjusting the rear wheel supporting levers, the rear wheels can be moved to adjust the height of the rear end of the platform and by varying the number of washers, the front end of the platform can be adjusted up and down.

10 Claims, 9 Drawing Figures

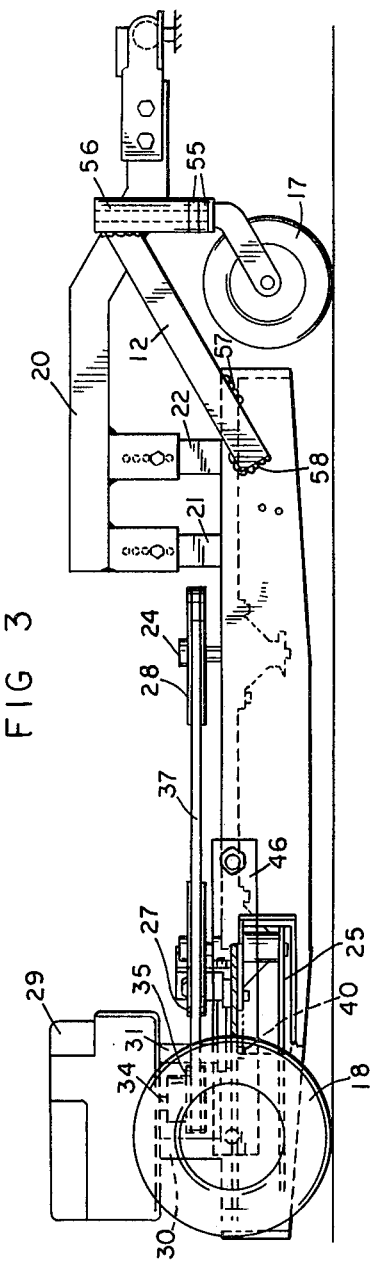
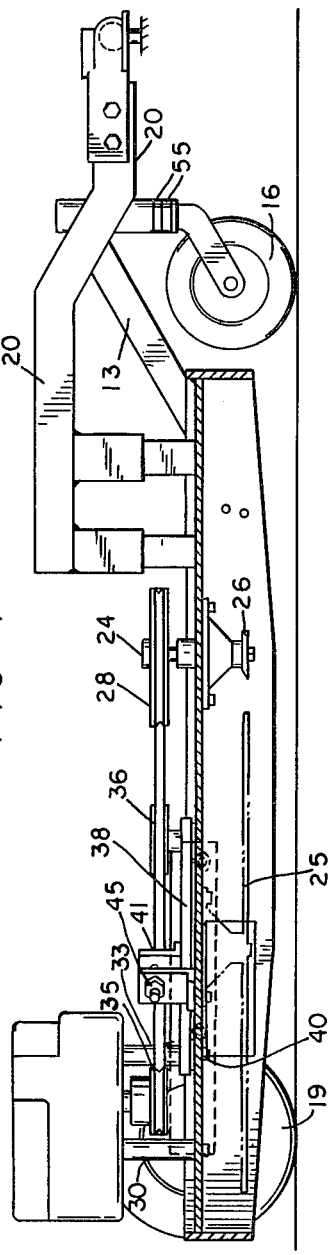

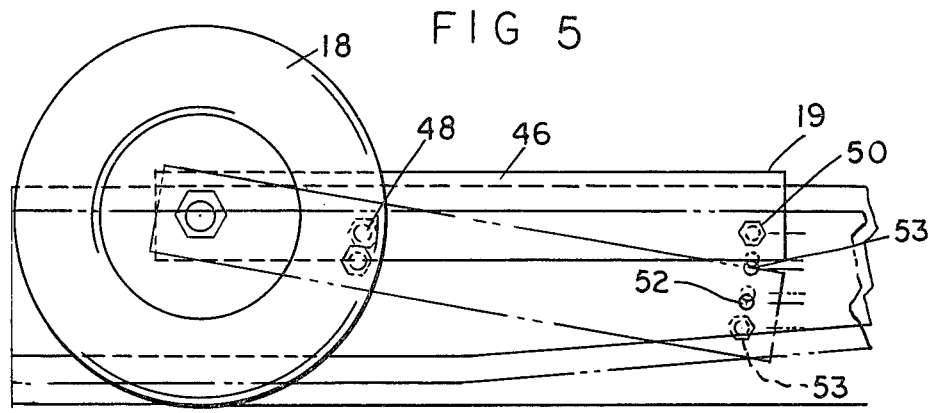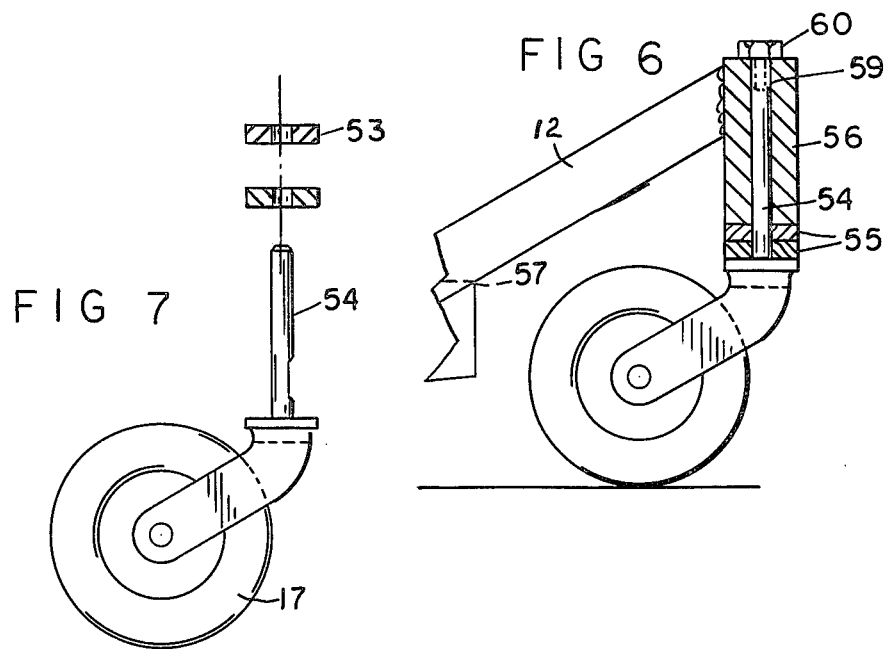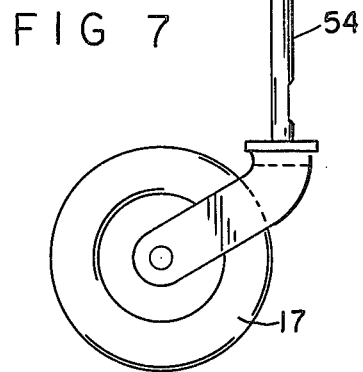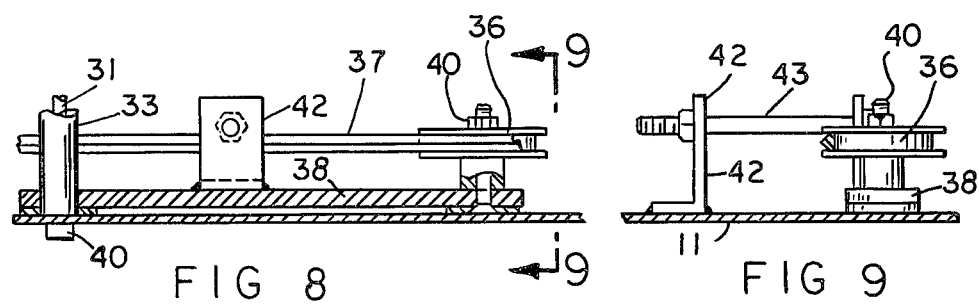

LAWN MOWER

REFERENCE TO PRIOR ART

The mower disclosed herein constitutes an improvement over the following patents: U.S. Pat. Nos. 3,000,165, 2,920,434, 3,068,631, 3,619,996.

OBJECTS OF THE INVENTION

It is an object of the invention to provide an improved rotary mower.

Another object of the invention is to provide a mower that is simple in construction, economical to manufacture and simple and efficient to use.

Another object of the invention is to provide an improved, vertically adjustable carriage for a rotary mower.

Another object is to provide an improved blade drive.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 3 is a side view partly in cross-section taken in line 3—3 of FIG. 2.

FIG. 4 is a cross-sectional view taken in line 4—4 of FIG. 2.

FIG. 5 is an enlarged partial view of a rear wheel support.

FIG. 6 is an enlarged partial view of a front wheel and support.

FIG. 7 is an exploded view of part of the wheel of FIG. 6.

FIG. 8 is a partial cross-sectional view of the belt tightener taken at line 8—8 of FIG. 2.

FIG. 9 is a cross-sectional view taken on line 9—9 of FIG. 2.

DETAILED DESCRIPTION OF THE DRAWINGS

Figure 1:
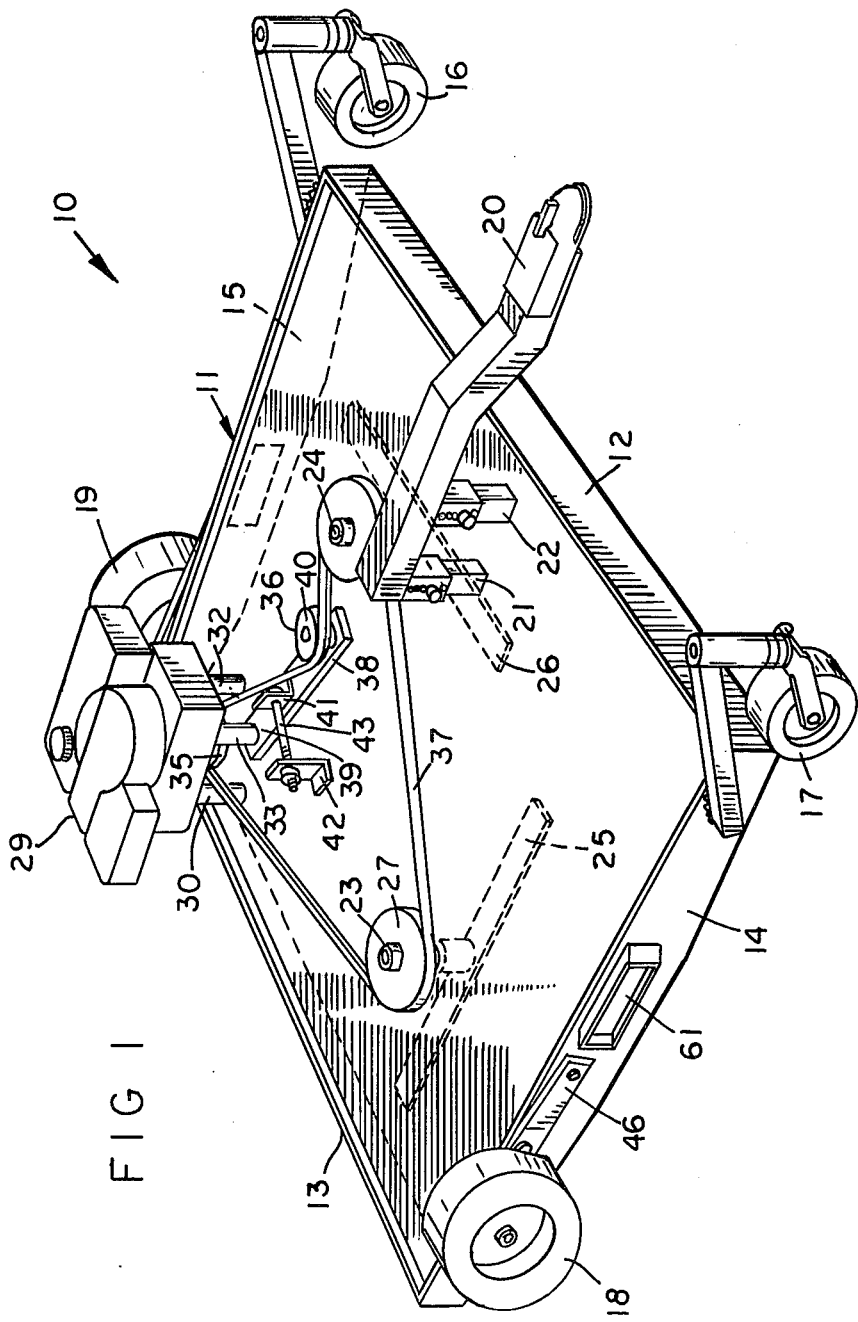
FIG. 1 is an isometric view of the mower according to the invention.
Figure 2:
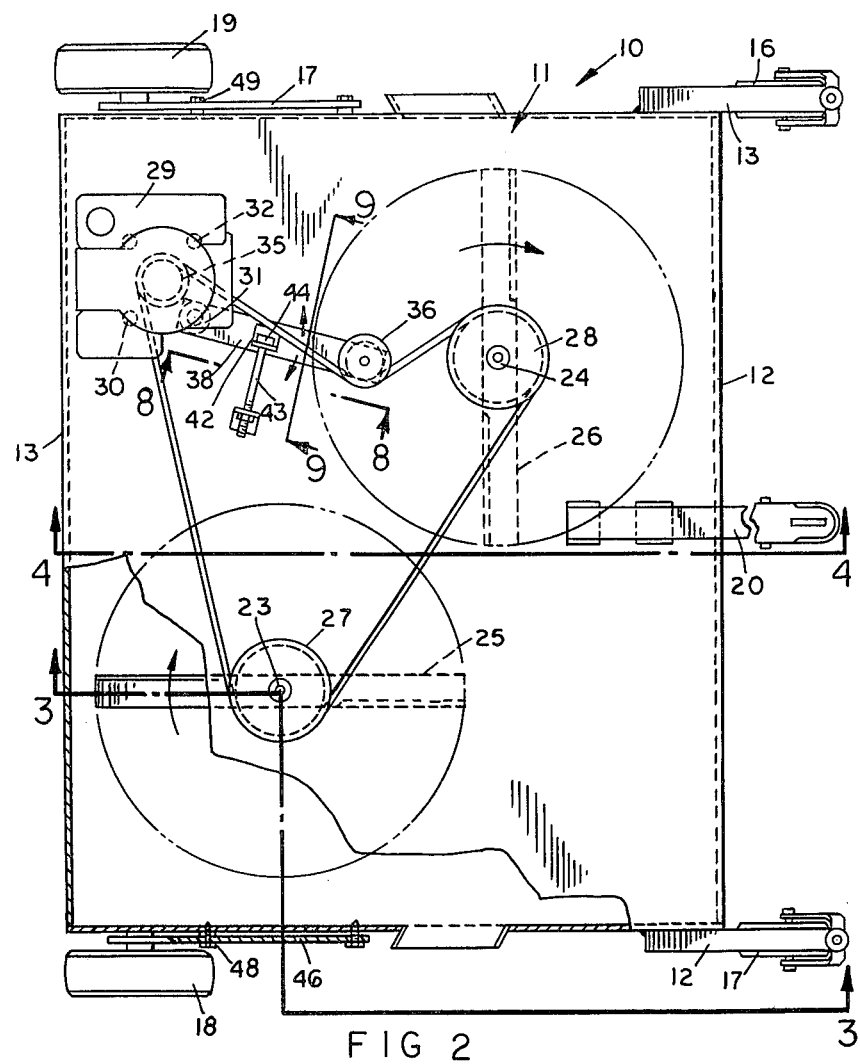
FIG. 2 is a top view partly in cross-section of the mower shown in FIG. 1.

A rotary mower 10 for cutting grass, weeds, brush and the like is disclosed. The mower 10 has a rectangular platform 11 supported by two front caster wheels 16 and 17 and two rear vertically adjustable wheels 18 and 19. The platform 11 has four downwardly extending flanges which are front flanges.

Front caster wheels 16 and 17 are attached on arms 12, rear flange 13, right side flange 14, and left side flange 15 extending upwardly and forwardly and rear wheels 18 and 19 are fixed to the distal end of levers which are pivoted to the side skirts and are adjustable up and down. Hitch 20 is attached to the center of the front, and it is supported on spaced columns 21 and 22. Spaced blade supports 23, 24 have shafts extending down through bearings in the platform, and shaft 23 has a blade 25 on its lower end. Shaft 24 has blade 26 on its lower end. The upper end of the shafts 23 and 24 have pulleys 27 and 28. An internal combustion engine 29 which is of a familiar type is supported on four welded columns 30, 31, 32, and 33. Fourth column 33 pierces lever 38 which is free to rotate around column 33 to act as a belt-tensioner lever. The engine 29 has a downwardly extending shaft 34 and the lower end of the motor shaft 34 has a pulley 35 which engages a belt 37 which passes around the two blade drive pulleys 27 and 28 on the shafts 23 and 24 likewise around motor pulley 35 and belt tightener pulley 36.

Belt tightener pulley 36 is supported on the distal end of the belt tightener lever 38 via a welded threaded stud and the first end 39 of the lever 38 is pierced by cylinder 33 via a hole drilled in the first end 39 of lever 38 larger in diameter than column 33 to act as a swivel lever. Belt tightener lever 38 has pulley 36 pivoted to its distal end at 40, and "L" shaped lug 41 is welded to lever 38 between end 39 and pulley 36, "L" shaped lug 42 is welded to platform 11. Each of the lugs 41 and 42 has a hole which receives bolt 43 which has a head 44 on one end and a nut 45 on the other end. By tightening nut 45 on bolt 43 the lever 38 is swung, tightening the belt.

The tongue 20 is supported on two spaced columns 21 and 22 which are welded to the platform which telescopically receive the tubes that are attached to the tongue and spaced bolts 60 extend into the columns and selectively received in the spaced holes 61 in the sleeves 62 and 63. By selecting the proper hole for bolts 60, the hitch can be adjusted to take most of the weight off the towing vehicle.

The rear wheels 18 and 19 are supported on the distal end of levers 46 and 47 which are pivoted to the side skirts of the frame by pivots 48 and 49 and the rear wheels 18 and 19 are supported on the other end of each lever 46 and 47. The opposite end of the levers 46 and 47 are held in place by studs 50 and 51 that extend through the lever and are selectively received in spaced holes 52 and 53 in the side of the skirt to adjust the rear wheels up and down by placing the bolt in the proper hole.

The caster wheels 16 and 17 are each carried by vertical rods 54 which have washers 59 received on their upper ends which can be supported on the rods 54 below the vertical drilled cylinders 56 on the caster supporting arms 55. Arms 55 are welded to the front corners of the platform 14 (right side) at 57 and 58 and extend upwardly and forwardly and are welded to vertical cylinder 56. An axial threaded hole 57 is formed in the upper end of each rod 54. This hole threadably receives stud 58 which has a head that overlies the upper end of cylinder 56 and retains the rod 54 in it. This allows caster wheel 17 attached to caster reels 54 to swivel within vertical cylinder 56.

Grass discharge openings are provided at each side of the side skirts.

The foregoing specification sets forth the invention in its preferred, practical forms but the structure shown in capable of modification within a range of equivalents without departing from the invention which is to be understood is broadly novel as is commensurate with the appended claims.

The embodiments of the invention in which an exclusive property or privilege is claimed are defined as follows:

1. In combination, a mower having
a rectangular platform, two rear ground engaging wheels and two front engaging wheels, means vertically and adjustably supporting said rear wheels and said front wheels on said platform, an internal combustion engine, support means supporting said engine on said platform, two spaced blade shafts extending downward through said platform, each said blade shaft having a blade on its end below said platform, a pulley on each said blade shaft, an engaging pulley on said engine shaft, a belt tightener pulley, tension means supporting said belt tightener pulley on said platform, said engine support means comprising four spaced, downwardly extending columns welded on said platform and supporting said engine, said tension means comprising a belt tensioner arm having said belt tightener pulley on the first end and pivoting other end of said belt tightener arm around the right front engine support column, said engine support means comprising four spaced downwardly extending columns welded on said platform and and a belt passing around said pulleys.

2. The combination recited in claim 1 wherein said arm has a lug at an intermediate point between said ends, a second lug fixed to said platform, and tightening means connecting said lugs to urge said belt tightener pulley toward said belt.

3. The combination recited in claim 2 wherein each of said rear wheels is supported on said platform by means of a rear wheel supporting lever, each said rear wheel being pivoted to the first end of one said wheel supporting lever, pivot means pivoting an intermediate point of said rear wheel supporting lever to the frame and spaced holes in said frame, and studs extending through a second end of said lever opposite said first end and adapted to engage one of said spaced holes for adjusting the height of said platform by swinging the rear wheels up and down.

4. The combination recited in claim 2 wherein said front wheels are caster wheels, said caster wheels are supported on said frame by means of arms attached to the side of said platform and extending upwardly and forwardly therefrom, a drilled cylinder attached to the forward end of each said arm, each said caster wheel having a vertically extending rod extending into said drilled cylinders, fork means attached to the lower end of each said rod and washers being adapted to be selectively placed on each said rod between said cylinder and said fork for adjusting the height of the front end of said platform.

5. The combination recited in claim 4 wherein a hitch is fixed to a front part of said platform for attaching said hitch to a towing vehicle.

6. The combination recited in claim 1 wherein said pivot means pivoting a second end of said arm to said platform comprises, said right front column spaced from said three columns, said arm being pierced by said right front column,
said lever being freely swingable about said right front column.

7. The combination recited in claim 2 wherein said tightening means urging said idler pulley toward said belt comprises, a threaded member extending through said holes in said lugs and being adapted to urge said idler pulley toward said belt.

8. The combination recited in claim 1 wherein said supporting means for said rear wheels comprises, arms having an intermediate hole receiving a pivot bolt swingably supporting said arm to said platform, a second opening adjacent to the end of said arm receiving an axle bolt holding said wheel to said arm, and a third hole in said arm at the end thereof remote from said second hole, a plurality of holes in said frame adapted to selectively receive a bolt extending through said third hole and through one of said spaced holes in said frame, thereby adjustably holding said wheel in spaced relation to said platform.

9. The combination recited in claim 1 wherein said supporting means for said front wheels comprises, an arm extending upwardly and forwardly from said frame and fixed at its lower end to said frame, a drilled cylindrical member fixed to the front end of said arm and extending downwardly therefrom, each front wheel being a caster wheel having a column extending upwardly through said drilled member and spaced washers on said caster member below said drilled cylindrical member for adjusting the height of the front of said platform.

10. The combination recited in claim 1 wherein means is provided to adjust said hitch up or down on said platform to control the height of said hitch above the ground.

* * * * *